United States Patent
Purdy et al.

(10) Patent No.: US 12,180,423 B2
(45) Date of Patent: Dec. 31, 2024

(54) METHODS FOR STIMULATING HYDROCARBON-BEARING FORMATIONS

(71) Applicant: Fluid Energy Group Ltd., Calgary (CA)

(72) Inventors: Clay Purdy, Medicine Hat (CA); Markus Weissenberger, Calgary (CA)

(73) Assignee: DORF KETAL CHEMICALS FZE, Fujairah (AE)

( * ) Notice: Subject to any disclaimer, the term of this patent is extended or adjusted under 35 U.S.C. 154(b) by 0 days.

(21) Appl. No.: 17/934,293

(22) Filed: Sep. 22, 2022

(65) Prior Publication Data

US 2023/0034895 A1     Feb. 2, 2023

Related U.S. Application Data

(63) Continuation of application No. 16/747,449, filed on Jan. 20, 2020, now Pat. No. 11,485,902, which is a (Continued)

(30) Foreign Application Priority Data

May 11, 2018 (CA) ..................... 3004675

(51) Int. Cl.
 *C09K 8/74* (2006.01)
 *C09K 8/03* (2006.01)
 (Continued)

(52) U.S. Cl.
 CPC ............... *C09K 8/74* (2013.01); *C09K 8/032* (2013.01); *C09K 8/06* (2013.01); *C09K 8/426* (2013.01);
 (Continued)

(58) Field of Classification Search
 CPC ..................................... E21B 43/26
 See application file for complete search history.

(56) References Cited

U.S. PATENT DOCUMENTS 3,517,745 A   6/1970 Suman, Jr.
3,773,465 A   11/1973 Keeney et al.
(Continued)

FOREIGN PATENT DOCUMENTS

CA   2950370 A1   6/2018
WO   2016049742 A1   9/2015

OTHER PUBLICATIONS

Schlumberger Oilfield Glossary entry for "spotting", accessed Jun. 2, 2020 via glossary.oilfield.slb.com.

*Primary Examiner* — William D Hutton, Jr.
*Assistant Examiner* — Avi T Skaist

(57) ABSTRACT

A method for the fracking or stimulation of a hydrocarbon-bearing formation, said method comprising the steps of: providing a wellbore in need of stimulation; inserting a plug in the wellbore at a predetermined location; inserting a perforating tool and a spearhead or breakdown acid into the wellbore; positioning the tool at said predetermined location; perforating the wellbore with the tool thereby creating a perforated area; allowing the spearhead acid to come into contact with the perforated area for a predetermined period of time sufficient to prepare the formation for fracking or stimulation; removing the tool from the wellbore; and initiating the fracking of the perforated area using a fracking fluid. Also disclosed is a corrosion inhibiting composition for use with the acid composition.

7 Claims, 5 Drawing Sheets

Related U.S. Application Data continuation of application No. 16/408,202, filed on May 9, 2019, now Pat. No. 11,168,246.

(51) Int. Cl.

| | |
|---|---|
| *C09K 8/06* | (2006.01) |
| *C09K 8/42* | (2006.01) |
| *C09K 8/46* | (2006.01) |
| *C09K 8/54* | (2006.01) |
| *C09K 8/60* | (2006.01) |
| *C23F 11/04* | (2006.01) |
| *E21B 21/00* | (2006.01) |
| *E21B 41/02* | (2006.01) |
| *E21B 43/119* | (2006.01) |
| *E21B 43/26* | (2006.01) |
| *E21B 43/27* | (2006.01) |
| *E21B 43/28* | (2006.01) |
| *E21B 33/12* | (2006.01) |
| *E21B 43/116* | (2006.01) |

(52) U.S. Cl.
CPC .......... C09K 8/46 (2013.01); C09K 8/54 (2013.01); C09K 8/602 (2013.01); C23F 11/04 (2013.01); E21B 21/00 (2013.01); E21B 41/02 (2013.01); E21B 43/119 (2013.01); E21B 43/26 (2013.01); E21B 43/27 (2020.05); E21B 43/283 (2013.01); *C09K 2208/32* (2013.01); *E21B 33/12* (2013.01); *E21B 43/116* (2013.01)

(56) References Cited

U.S. PATENT DOCUMENTS

| | | | |
|---|---|---|---|
| 4,498,997 | A | 2/1985 | Walker |
| 5,131,472 | A | 7/1992 | Dees et al. |
| 5,854,180 | A | 12/1998 | Scherubel et al. |
| 2001/0050172 | A1 | 12/2001 | Tolman et al. |
| 2002/0020535 | A1 | 2/2002 | Johnson et al. |
| 2004/0099418 | A1* | 5/2004 | Behrmann ............ E21B 37/08 166/279 |
| 2005/0123437 | A1 | 5/2005 | Cassidy et al. |
| 2006/0243443 | A1 | 11/2006 | Matthews |
| 2010/0261623 | A1 | 10/2010 | Cassidy et al. |
| 2015/0114647 | A1* | 4/2015 | Jiang ................ C09K 8/74 166/305.1 |
| 2016/0040520 | A1 | 2/2016 | Tolman et al. |
| 2016/0347993 | A1* | 12/2016 | Purdy ................ E21B 43/25 |
| 2016/0347994 | A1 | 12/2016 | Purdy et al. |
| 2017/0096596 | A1 | 4/2017 | Purdy et al. |
| 2017/0101350 | A1 | 4/2017 | Purdy et al. |
| 2017/0210980 | A1 | 7/2017 | Purdy et al. |
| 2017/0275522 | A1 | 9/2017 | Purdy et al. |
| 2017/0292066 | A1 | 10/2017 | Purdy et al. |
| 2017/0306503 | A1 | 10/2017 | Purdy et al. |
| 2017/0313932 | A1 | 11/2017 | Purdy et al. |
| 2018/0127882 | A1 | 5/2018 | Reyes et al. |
| 2018/0274348 | A1* | 9/2018 | Karale ................ C09K 8/601 |
| 2019/0345807 | A1 | 11/2019 | Purdy et al. |

\* cited by examiner

METHODS FOR STIMULATING HYDROCARBON-BEARING FORMATIONS

CROSS-REFERENCE TO RELATED APPLICATION

This application is a continuation application of U.S. Application No. 16/747,449 filed Jan. 20, 2020, which claims the benefit of and priority to U.S. application Ser. No. 16/408,202, filed May 9, 2019, now U.S. Pat. No. 11,168,246 issued Nov. 9, 2021, which claims the benefit of and priority to Canadian Application No. 3,004,675, filed May 11, 2018. The entire specifications and figures of the above-referenced applications are hereby incorporated in their entireties by reference herein.

FIELD OF THE INVENTION

This invention relates to method for performing enhanced stimulation recovery operations on a hydrocarbon-bearing formation, more specifically to a method to enhance well productivity while also substantially reducing various inputs (time, water, etc.).

BACKGROUND OF THE INVENTION

In the oil & gas industry, stimulation with an acid is performed on a well to increase or restore production. In some instances, a well initially exhibits low permeability, and stimulation is employed to commence production from the reservoir. In other instances, stimulation or remediation is used to further encourage permeability and flow from an already existing well that has become under-productive due to scaling issues or formation depletion.

Acidizing is a type of stimulation treatment which is performed above or below the reservoir fracture pressure in an effort to initiate, restore or increase the natural permeability of the reservoir. Acidizing is achieved by pumping acid, predominantly hydrochloric acid, into the well to dissolve typically limestone, dolomite and calcite cement between the acid insoluble sediment grains of the reservoir rocks or to treat scale accumulation.

There are three major types of acid applications: matrix acidizing, fracture acidizing, and breakdown or spearhead acidizing (pumped prior to a fracturing pad or other operation in order to assist with formation breakdown (reduce fracture pressures, decrease injection rate pressures), as well as clean up cement in the well bore or perforations after the perforation process is completed.

A matrix acid treatment is performed when acid is pumped into the well and into the pores of the reservoir formation below the fracture pressure. In this form of acidization, the acids dissolve the sediments formation and/or mud solids that are inhibiting the permeability of the rock, enlarging the natural pores of the reservoir (wormholing) and stimulating the flow of hydrocarbons to the wellbore for recovery.

While matrix acidizing is done at a low enough pressure to keep from fracturing the reservoir rock, fracture acidizing involves pumping acid into the well at a very high pressure, physically fracturing the reservoir rock and etching the permeability inhibitive sediments. This type of acid treatment forms channels or fractures through which the hydrocarbons can flow, in addition to forming a series of wormholes. In some instances, a proppant is introduced into the fluid which assists in propping open the fractures, further enhancing the flow of hydrocarbons into the wellbore. There are many different mineral and organic acids used to perform an acid treatment on wells. The most common type of acid employed on wells to stimulate production is hydrochloric acid (HCl), which is useful in stimulating carbonate reservoirs.

It has been proven that fracking or stimulating a well will improve the production substantially, as is well known to the person of ordinary skill in the art, a well can be fracked or stimulated multiple times during its production life cycle. The process of hydraulic fracturing or fracking requires the following steps. Once the determination of the wellbore's hydrocarbon bearing areas has been assessed, the location of the perforations is determined and finalized. Subsequently, after a cemented liner or casing is in place, one must pump an isolation plug and perforating guns to a desired depth and location. The plug is set slightly beyond the desired location to be stimulated based on the well design, and then the casing in that area is perforated allowing access from the wellbore to the formation of interest, creating a path for fluid to be introduced into the formation.

The next stage prior to stimulation requires the use of perforating guns, typically a bottom hole assembly (BHA) with shaped charges moved to a predetermined location within the wellbore. Once in position, the perforating gun is discharged which perforates the casing and initiates a path for the stimulation fluid to reach the formation.

According to the conventional process, after plug setting and perforation stage is completed, the perforating tool BHA is removed from the wellbore. A ball is pumped down to isolate the zones below the plug, if not already in place. This process does not apply to solid bridge plugs (no ball) with which process it is required to squeeze or inject the wellbore fluid into the perforations at low or reduced rates until acid reaches the perforations or to initiate the fracture process with no acid. The challenge with this process utilizing no acid is the injection pressure are typically higher than when acid is introduced to the perforations which will clean cement debris as well as assist in the reduction of injection pressures, particularly in carbonate bearing formations. A challenge within the industry is the increased time and water required to use acid on all stages, thus an alternative process and acid system that does not increased the time or water usage is highly advantageous.

A volume of stimulation fluid is then pumped into the desired formation of the well. Typically, the high-pressure at which the fracturing fluid is pumped coupled with the staging or increased pumping rates and proppant in most cases, provide an increase in the fluidic pressure within the formation which leads to fractures being propagated within the reservoir allowing the flow of hydrocarbons to the wellbore for recovery.

After the desired breakdown pressure is reached, fracturing fluid containing propping agents are injected into the formation to ensure the fractures remain propped open after the stimulation is completed and the pressures are reduced.

A slickline is a single strand wire used in the oil and gas industry transport tools within a well. It is typically a single wire strand set up on a spool located on what is referred to as a slickline truck. A slickline is connected by the drum it is spooled off the back of the slickline truck. A slickline is used to lower tools within a wellbore in order to perform a specific operation.

In highly deviated wells, flow restricted wells or specific other mechanical or stimulation methods may require coiled tubing to be utilized to transport or place the perforation guns into position, i.e. at a predetermined location. Modern slickline, coiled tubing or wireline may also allow incorporated integrated information transmission technology which can communicate real time information to the operator including but not limited to; depth, temperature and pressure. This type of information provides operators sufficient information to perform a plug and perforation operation by accurately targeting desirable hydrocarbon-bearing formations.

The benefit of this strategy is greater control of the placement of perorations and thus the stimulation. In many cases, casing the entire wellbore allows the operator better control of the stimulation, production and other life-cycle aspects of the reservoir fluids. It also allows the operator to select the formation which will be stimulated in order to obtain increased well production. It also allows the operator to seal off perforated sections, which have had their hydrocarbons extracted or are producing minimal oil or gas etc.

Accordingly, in light of the state of the art of fracking technology, there still exists a need to successfully develop a method or improve the current method which reduces the waste of water, minimizes equipment time on each stage of the method, provides a more optimal, reduced injection rate for the stage, provide a method and chemical to ensure optimal diversion of acid across all perforations as currently acid will tend to go the path of least resistance due to down-hole fluid dynamics. Most acid will only reach the top portion of perforations causing an increased or non-optimal injection rate and associated pressures during the stimulation. The resolution of this problem lies in combining a chemical composition with the mechanical tools in a specific order to achieve a more efficient oil recovery method.

SUMMARY OF THE INVENTION

It is an object of the present invention to provide for a novel, commercially proven and successful method for fracking a well which overcomes some drawbacks or limitations of conventional methods. According to a first aspect of the present invention there is provided a method for the fracking or stimulation of a hydrocarbon-bearing formation, said method comprising the steps of:
  providing a wellbore in need of stimulation;
  inserting a plug in the wellbore at a predetermined location;
  inserting a perforating tool and a spearhead or breakdown acid into the wellbore simultaneously;
  positioning the tool at said predetermined location;
  perforating the wellbore with the tool thereby creating access to the formation;
  allowing the spearhead acid to come into contact with the perforated area for a predetermined period of time sufficient to prepare the formation for fracking or stimulation;
  removing the perforating tool and wire-line from the wellbore; and
  initiating the stimulation of the perforated area using a stimulation fluid.

Preferably, the spearhead acid comprises a corrosion inhibitor adapted to prevent damaging corrosion to the tool, casing and wire-line or slick-line or coiled tubing during the period of exposure with said components. Preferably, the perforating tool is a perforating gun.

Preferably also, the spearhead acid is selected from the group consisting of: mineral acids; organic acids; modified acids; synthetic acids; and combinations thereof. More preferably, the spearhead acid further comprises a corrosion inhibitor. Even more preferably, the spearhead acid is selected from the group consisting of: methanesulphonic acid; HCl:amino acid; HCl:alkanolamine. Preferably, the amino acid is selected from the group consisting of: lysine; lysine monohydrochloride; alanine; asparagine; aspartic acid; cysteine; glutamic acid; histidine; leucine; methionine; proline; serine; threonine; valine; and combinations thereof. Preferably also, the alkanolamine is selected from the group consisting of: monoethanolamine; diethanolamine; triethanolamine and combinations thereof.

According to a preferred embodiment of the present invention, there is provided a corrosion inhibiting composition for use with an acid, said composition comprising: citral and/or cinnamaldehyde.

Preferably, the corrosion inhibiting composition comprises:
  an alkyne alcohol;
  a terpene, preferably selected from the group consisting of: citral; carvone; ionone; ocimene; cymene; and combinations thereof, most preferably the terpene is citral;
  cinnamaldehyde or a derivative thereof; and
  a solvent.

More preferably, the corrosion inhibiting composition comprises at least one surfactant. Preferably, the alkyne alcohol is propargyl alcohol. Preferably, the solvent is selected from the group consisting of: methanol; ethanol; short chain ethoxylates, such as a 6,3-ethoxylate; and isopropanol. More preferably, the solvent is isopropanol.

Preferably, the alkyne is present in an amount ranging from 10-40% v/v of the composition. Preferably also, citral is present in an amount ranging from 5-15% v/v of the composition. Preferably also, the cinnamaldehyde or a derivative thereof is present in an amount ranging from 7.5-20% v/v of the composition. Preferably also, the solvent is present in an amount ranging from 10-40% v/v of the composition. According to a preferred embodiment of the present invention, the surfactant is present in an amount ranging from 10-40% v/v of the composition. Preferably, the surfactant comprises a betaine or a sultaine. According to a preferred embodiment, the surfactant comprises a betaine and β-Alanine, N-(2-carboxyethyl)-N-dodecyl-, sodium salt (1:1).

Preferably, the corrosion inhibiting composition further comprises a metal iodide or iodate selected from the group consisting of: cuprous iodide; potassium iodide and sodium iodide.

According to an aspect of the present invention there is provided a method for placing acid in a wellbore, said method comprising the steps of:
  providing a wellbore in need of stimulation;
  inserting a plug in the wellbore at a location slightly beyond a predetermined location;
  inserting a perforating tool and a spearhead or breakdown acid into the wellbore;
  positioning the tool at said predetermined location;
  perforating the wellbore with the tool thereby creating a perforated area; and
  allowing the spearhead acid to come into contact with the perforated area for a predetermined period or perforating in the acid, thereby ensuring optimal diversion of the acid across the peroration clusters.

According to a preferred embodiment of the present invention, the corrosion inhibitor composition is effective at a temperature of up to 110° C., and in some preferred compositions effective at temperature of up to 130° C., and, in some cases, some preferred compositions provide effective corrosion protection at a temperature of up to 180° C. for several hours.

According to one aspect of the present invention, the corrosion inhibitor composition provides effective protection to both carbon steel alloys as well as stainless steel for the duration period either the tools, wire-line, coiled tubing and casing are exposed to the acidic composition.

BRIEF DESCRIPTION OF THE FIGURES

Features and advantages of embodiments of the present application will become apparent from the following detailed description and the appended figures, in which:

FIG. 3A shows the conventional process and FIG. 3B shows a preferred embodiment of the method according to the present invention;

FIG. 4A shows a preferred embodiment of the method according to the present invention and FIG. 4B shows the conventional process

DESCRIPTION OF THE INVENTION

Figure 1:
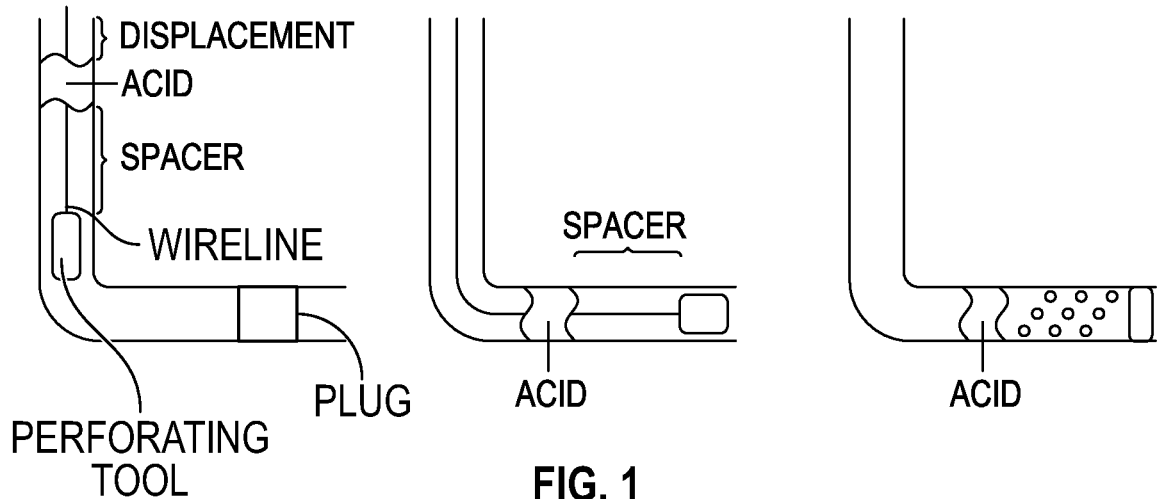
FIG. 1 is a schematic diagram illustrating the general steps according to a preferred method of the present invention.
Figure 2:
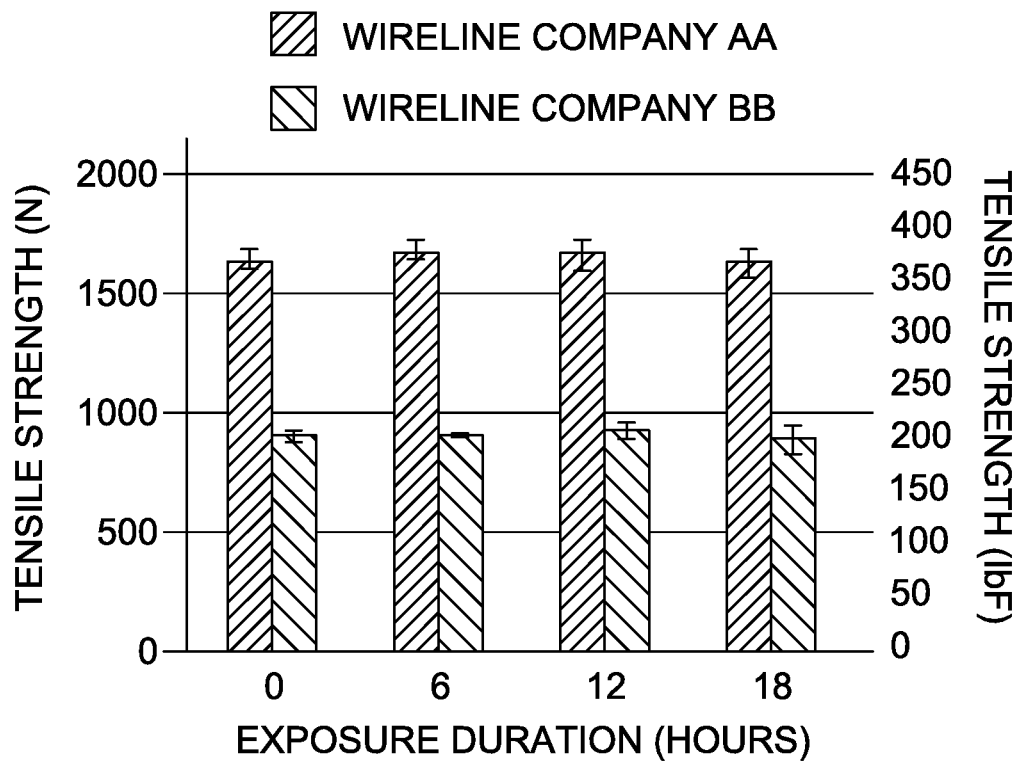
FIG. 2 is a comparative chart tensile strength of wire line samples after exposure to 33% MEA:HCl (in a molar ratio of 1:6.4) at 110° C. (230° F.)

The description that follows, and the embodiments described therein, is provided by way of illustration of an example, or examples, of particular embodiments of the principles of the present invention. These examples are provided for the purposes of explanation, and not limitation, of those principles and of the invention.

In a conventional plug and perf operation, the plug is set in the well, it is perforated by a tool (guns), then the spent perforating tool is pulled out of the hole and then acid is pumped and circulated to the perforations (this process can add substantial time and water consumption to the completion of the stage based on pump rates, feed rates, flow restrictions, completion methods) and once a feed rate is reached they begin the frac for that stage. The process is then repeated up to the number of stages (over 100 times in many wells is becoming commonplace).

According to a preferred embodiment of the present invention, the method allows for an operator to pump the tools down with the spearhead acid to perforate the zone in the acid or near the acid and let the acid sit over the perforations or have the acid in place next to the perforations thus saving substantial time and water in each stage of the well. This is followed by the removal of the tool from the wellbore and initiating of the fracturing immediately.

According to a preferred embodiment of the present invention, this method can save up to one (1) hour per stage (or even more in the case of some tight formations, flow limiting components, wellbore restrictions, mechanical failures etc.) at an average cost of $20,000/hr (for a frac crew) and up to or over 15,000 gallons of water per stage. In a 50-stage well, this can translate into savings of potentially over $1,000,000 in time plus the saved water of up to 750,000 gallons. The potential savings from the implementation of this method in operations in the United States alone could reach upwards of several hundreds of millions of dollars per year and many millions of gallons of water conserved, greatly reducing the strain on the current water supply and management infrastructure HCl is the most commonly used acid in fracking or well stimulation. With this in mind, one must understand that perforation tools, casing, tubulars and other wellbore completion tools or equipment are mostly made of stainless steel and/or alloys high in chrome to ensure longevity, high tensile yields and long cycle lifespans, as well as to provide superior corrosion protection from wellbore fluids and gases, but not from standard HCl or acidic fluids and thus it is highly advantageous to have strong acid systems that can be deployed with such equipment with minimal concern for corrosion yet remain fully effective. Conventional plug and perforation processes require the removal of the perforation guns immediately after the perforation stage otherwise the spearhead acid would destroy the perforating guns over time because of its propensity to attack corrosion resistant alloys such as stainless steel, in particular 316 stainless steel. Although industry has made efforts to further minimize corrosion concerns with coated wire-line systems, the risk of acid penetrating coatings, having adverse exposure effects or becoming trapped between armor and cable materials is still a major concern for the industry. A critical factor in allowing an acid intensive process or procedure to have stainless steel alloys exposed to strong acids such as HCl or synthetic, organic or modified acids is the ability to control, minimize or virtually eliminate corrosion to a level below which would render a stainless-steel tool, wire-line or cable unusable after only a few uses (or even less) as corrosion can greatly alter the tensile yield of the cables or wire-line risking the loss of a tool which would then require an expensive fishing or recovery process. Many wire-line cables and perforating tool packages can cost many hundreds of thousands of dollars to replace or repair due to corrosion or catastrophic failures.

With the development of a novel corrosion inhibitor which affords substantial long-term acidic exposure protection of stainless steel alloys from damage from exposure to hydrochloric acid (HCl), there is a never-seen-before possibility of removing a step of the pre-fracking process on a large, proven and sustainable scale across a wide temperature range, thereby saving substantial time, money and water resources. The advantages are compounded when using optimal acidic compositions (i.e. effectiveness and corrosion inhibition) as more wells and more perforation operations can be carried out per day.

According to a preferred embodiment of the present invention, one can use a ball-in-cage to isolate the wellbore below the area to be perforated as the acidic composition (comprising the corrosion inhibitor) provides sufficient corrosion protection to maintain the integrity of the exposed components, including but not limited to the casing, wire-line, down-hole tools such as perforation tools, coiled tubing and slickline.

Preferably, the surfactant is selected from the group consisting of: a sultaine surfactant; a betaine surfactant; and combinations thereof. More preferably, the sultaine surfactant and betaine surfactant are selected from the group consisting of: an amido betaine surfactant; an amido sultaine surfactant; and combinations thereof. Yet even more preferably, the amido betaine surfactant and is selected from the group consisting of: an amido betaine comprising a hydrophobic tail from C8 to C16. Most preferably, the amido betaine comprising a hydrophobic tail from C8 to C16 is cocamidobetaine.

Preferably also, the corrosion inhibition package further comprises an anionic surfactant. Preferably, the anionic surfactant is a carboxylic surfactant. More preferably, the carboxylic surfactant is a dicarboxylic surfactant. Even more preferably, the dicarboxylic surfactant comprises a hydrophobic tail ranging from C8 to C16. Most preferably, the dicarboxylic surfactant is sodium lauriminodipropionate Most preferred are embodiments of a corrosion inhibition package comprising cocamidopropyl betaine and β-Alanine, N-(2-carboxyethyl)-N-dodecyl-, sodium salt (1:1).

According to a preferred embodiment of the present invention, when preparing an acidic composition comprising a corrosion inhibition package, metal iodides or iodates such as potassium iodide, sodium iodide, cuprous iodide and lithium iodide can be added as corrosion inhibitor intensifier. The iodide or iodate is preferably present in a weight/volume percentage ranging from 0.1 to 1.5%, more preferably from 0.25 to 1.25%, yet even more preferably 1% by weight/volume of the acidic composition. Most preferably, the iodide used is potassium iodide.

According to a preferred embodiment of the present invention, the corrosion package comprises: 2-Propyn-1-ol, compd. with methyloxirane; β-Alanine, N-(2-carboxyethyl)-N-dodecyl-, sodium salt (1:1); cocamidopropyl betaine; (±)-3,7-Dimethyl-2,6-octadienal (Citral); cinnamaldehyde; and isopropanol.

More preferably, the composition comprises 20% of 2-Propyn-1-ol, compd. with methyloxirane; 20% of β-Alanine, N-(2-carboxyethyl)-N-dodecyl-, sodium salt (1:1); 20% of cocamidopropyl betaine; 7.5% of (±)-3,7-Dimethyl-2,6-octadienal (Citral); 12.5% cinnamaldehyde; and 20% of Isopropanol (all percentages are volume percentages). A point of note, the surfactant molecules comprise only roughly ⅓ of the actual content of the entire surfactant blend as the balance, roughly ⅔, is comprised of water so as to control the viscosity of the surfactant when admixed with the other components. This is typical of surfactant blends in this and other industries.

According to a preferred embodiment of the present the corrosion inhibitor composition comprises cinnamaldehyde or a derivative thereof selected from the group consisting of: cinnamaldehyde; dicinnamaldehyde p-hydroxycinnamaldehyde; p-methylcinnamaldehyde; p-ethylcinnamaldehyde; p-methoxycinnamaldehyde; p-dimethylaminocinnamaldehyde; p-diethylaminocinnamaldehyde; p-nitrocinnamaldehyde; o-nitrocinnamaldehyde; 4-(3-propenal)cinnamaldehyde; p-sodium sulfocinnamaldehyde p-trimethylammoniumcinnamaldehyde sulfate; p-trimethylammoniumcinnamaldehyde o-methylsulfate; p-thiocyanocinnamaldehyde; p-(S-acetyl)thiocinnamaldehyde; p-(S—N,N-dimethylcarbamoylthio)cinnamaldehyde; p-chlorocinnamaldehyde; α-methylcinnamaldehyde; β-methylcinnamaldehyde; α-chlorocinnamaldehyde α-bromocinnamaldehyde; α-butylcinnamaldehyde; α-amylcinnamaldehyde; α-hexylcinnamaldehyde; α-bromo-p-cyanocinnamaldehyde; α-ethyl-p-methylcinnamaldehyde and p-methyl-α-pentylcinnamaldehyde.

According to a preferred embodiment, the acid is an aqueous modified acid composition comprising:
 a mineral acid and an alkanolamine in a molar ratio of not more than 15:1.

According to another preferred embodiment, the acid is an aqueous modified acid composition comprising:
 hydrochloric acid and an alkanolamine in a molar ratio of not more than 15:1.

According to a preferred embodiment, the acid is an aqueous modified acid composition according to claim 2, wherein the hydrochloric acid and alkanolamine are present in a molar ratio of not more than 10:1.

According to a preferred embodiment, the acid is an aqueous modified acid composition according to claim 2, wherein the hydrochloric acid and alkanolamine are present in a molar ratio of not more than 7.0:1. More preferably, hydrochloric acid and alkanolamine are present in a molar ratio of not more than 4:1. Even more preferably, hydrochloric acid and alkanolamine are present in a molar ratio of not more than 3:1.

According to a preferred embodiment, the alkanolamine is selected from the group consisting of: monoethanolamine; diethanolamine; triethanolamine and combinations thereof. Preferably, the alkanolamine is monoethanolamine.

According to a preferred embodiment of the present invention, the method uses a synthetic or modified acid composition comprising: a strong acid, such as hydrochloric acid and an alkanolamine in a molar ratio of not more than 15:1; preferably in a molar ratio not more than 10:1, more preferably in a molar ratio of not more than 8:1; even more preferably in a molar ratio of not more than 5:1; yet even more preferably in a molar ratio of not more than 3.5:1; and yet even more preferably in a molar ratio of not more than 2.5:1.

Preferably, the main components in terms of volume and weight percent of the composition set out above comprise an alkanolamine and a strong acid, such as HCl, nitric acid, sulfuric acid, sulfonic acid.

An alkanolamine, as per the above, contains at least one amino group, —NH$_2$, and one alcohol group, —OH. Preferred alkanolamines include, but are not limited to, monoethanolamine, diethanolamine and triethanolamine. More preferred are monoethanolamine, diethanolamine. Most preferred is monoethanolamine. When added to hydrochloric acid a Lewis acid/base adduct is formed where the primary amino group acts as a Lewis base and the proton of the HCl as Lewis acid. The formed adduct greatly reduces the hazardous effects of the hydrochloric acid on its own, such as the fuming effect, the hygroscopicity, and the highly corrosive nature. The excess nitrogen can also act as a corrosion inhibitor at higher temperatures.

The molar ratio of the two main components can be adjusted or determined depending on the intended application and the desired solubilizing ability. According to a preferred embodiment where the strong acid is HCl, one can increase the ratio of the HCl component to increase the solubilizing ability of the composition while still providing at least one of the following advantages: health; safety; environmental; and operational advantages over hydrochloric acid.

Various corrosion inhibitors can be incorporated into an acid composition used in a preferred embodiment of the method according to the present invention, such composition comprises a strong acid and an alkanolamine to reduce corrosion on the steel which is contacted.

Preferably, the composition may further comprise organic compounds which may act as corrosion inhibitors selected from the group consisting of: acetylenic alcohols, aromatic or aliphatic aldehydes (e.g. α,β-unsaturated aldehydes), alkylphenones, amines, amides, nitrogen-containing heterocycles (e.g. imidazoline-based), iminium salts, triazoles, pyridine and its derivatives or salts, quinoline derivatives, thiourea derivatives, thiosemicarbazides, thiocyanates, quaternary amine salts, and condensation products of carbonyls and amines. Intensifiers which can be incorporated into compositions according to the present invention are selected from the group consisting of: formic acid, potassium iodide, antimony oxide, copper iodide, sodium iodide, lithium iodide, aluminum chloride, bismuth oxide, calcium chloride, magnesium chloride and combinations of these. Preferably, an iodide compound such as potassium iodide is used. Other additives can be optionally added to a composition according to a preferred embodiment of the present invention. A non-limiting list of such common additives includes iron control agents (e.g. reducing agents), water-wetting surfactants, non-emulsifiers, deemulsifiers, foaming agents, anti-sludging agents, clay and/or fines stabilizer, scale inhibitors, mutual solvents, friction reducer. Alcohols and derivatives thereof, such as alkyne alcohols and derivatives and preferably propargyl alcohol and derivatives thereof can be used as corrosion inhibitors. Propargyl alcohol itself is traditionally used as a corrosion inhibitor which works well at low concentrations. It is however a very toxic/flammable chemical to handle as a concentrate, so care must be taken when exposed to the concentrate. In some cases, it is preferred to use 2-Propyn-1-ol, complexed with methyloxirane, as this is a much safer derivative to handle. Basocorr® PP is an example of such a compound. Metal iodides or iodates such as potassium iodide, sodium iodide, cuprous iodide and lithium iodide can potentially be used as corrosion inhibitor intensifier along with the composition according to preferred embodiments of the present invention. In fact, potassium iodide is a metal iodide traditionally used as corrosion inhibitor intensifier, however it is expensive, but works extremely well. It is non-regulated and safe to handle. The iodide or iodate is preferably present in a weight percentage ranging from 0.1 to 5 wt %, more preferably from 0.2 to 3 wt %, yet even more preferably from 0.25 to 2 wt %.

Example 1—Process to Prepare a Modified Acid Composition

Monoethanolamine (MEA) and hydrochloric acid are used as starting reagents. To obtain a 4.1:1 molar ratio of MEA to HCl, one must first mix 165 g of MEA with 835 g of water. This forms the monoethanolamine solution. Subsequently, one takes 370 ml of the previously prepared monoethanolamine solution and mixes with 350 ml of HCl aq. 36% (22 Baume). When additives are used, they are added after thorough mixing of the MEA solution and HCl. For example, potassium iodide can be added at this point as well as any other component desired to optimize the performance of the composition according to the present invention. Circulation is maintained until all products have been solubilized. Additional products can now be added as required.

The resulting composition of Example 1 is a clear (slightly yellow) liquid having shelf-life of greater than 1 year. It has a boiling point temperature of approximately 100° C. It has a specific gravity of 1.1±0.02. It is completely soluble in water and its pH is less than 1. The freezing point was determined to be less than −35° C.

The composition is biodegradable and is classified as a mild irritant according to the classifications for skin tests. The composition is substantially lower fuming compared to 15% HCl. Toxicity testing was calculated using surrogate information and the LD50 was determined to be greater than—1300 mg/kg. Preferred Methanolamine:HCl composition comprise a composition having MEA:HCl in a 1:4.1 molar ratio, MEA-HCl in a 1:6.4 molar ratio, and MEA-HCl in a 1:9.9 molar ratio. Each one of these compositions has a transparent, slight yellow appearance. The respective specific gravity at 23° C. is 1.1, 1.121, and 1.135. Their % salinity is, respectively 31.20%, 36.80%, and 40.00%. They all have a slight sharp or sharp odor. Their boiling point is 100° C. and they have a freezing point of −35° C. The acid strength, (in ml) in the presence of 1N NaOH is, respectively, 4.9, 6.3, and 7.5. Their pH is −0.11, −0.41, and −0.73, respectively.

According to a preferred embodiment of the present invention, the composition comprising an alkanolamine and a strong acid may further comprise a corrosion inhibition package itself comprising a terpene; a cinnamaldehyde or a derivative thereof; at least one amphoteric surfactant; and a solvent.

In other preferred embodiments of the present invention, 2-Propyn-1-ol, complexed with methyloxirane can be present in a range of 0.05-5.0 wt/wt %, preferably it is present in an amount ranging from 0.1 to 3 wt %, even more preferably from 0.5 to 2.0 wt/wt % and yet even more preferably from 0.75 to 1.5 wt/wt %. As a substitute for potassium iodide one could use sodium iodide, copper iodide and lithium iodide. However, potassium iodide is the most preferred.

According to a preferred embodiment of the present invention, there is provided a method of matrix acidizing a hydrocarbon-containing limestone formation, said method comprising:
  providing a composition comprising a HCl and lysine mixture and water; wherein the molar ratio between the HCl and the lysine ranges from 4.5:1 to 8.5:1,
  injecting said composition downhole into said formation at a pressure below the fracking pressure of the formation; and
  allowing a sufficient period of time for the composition to contact said formation to create wormholes in said formation.

Lysine & hydrogen chloride are present in a molar ratio ranging from 1:3 to 1:12.5; preferably in a molar ratio ranging from 1:4.5 to 1:9, and more preferably in a molar ratio ranging from more than 1:5 to 1:8.5.

According to a preferred embodiment of the present invention, the acid used is neat HCl.

The corrosion inhibitor composition further comprises a metal iodide or iodate selected from the group consisting of: cuprous iodide; potassium iodide and sodium iodide. Preferably, the metal iodide or iodate is potassium iodide. According to another preferred embodiment of the present invention, the metal iodide or iodate is sodium iodide. According to yet another preferred embodiment of the present invention, the metal iodide or iodate is cuprous iodide.

Table 1 includes a prior composition (CI-5) and a composition according to a preferred embodiment of the present invention (CI-5SS).

TABLE 1

Composition of various tested corrosion inhibitor packages

| | | CI-5 | CI-5SS |
|---|---|---|---|
| 2-Propyn-1-ol, compd. with methyloxirane | Vol % | 45 | 20 |
| .beta.-Alanine, N-(2-carboxyethyl)-N-dodecyl-, sodium salt (1:1) | Vol % | 11.7 | 20 |
| Cocamidopropyl betaine | Vol % | 11.7 | 20 |
| (±)-3,7-Dimethyl-2,6-octadienal (Citral) | Vol % | 7 | 7.5 |
| Cinnamaldehyde | Vol % | 0 | 12.5 |
| Isopropanol | Vol % | 24.6 | 20 |
| | Total Vol % | 100 | 100 |

Corrosion Testing

Corrosion inhibitor compositions according to preferred embodiments of the present invention were exposed to corrosion testing. The results of the corrosion tests and comparative corrosion testing are reported in Tables 2 through 5. Various steel grades (stainless steel and carbon steel) were subjected to acid compositions comprising corrosion inhibitors according to the present invention against known corrosion inhibitors to the listed compositions for various periods of time at varying temperatures. A desirable corrosion inhibition result was one where the lb/ft2 corrosion number is at or below 0.05. More preferably, that number is at or below 0.02.

33% HCl:MEA in a 5.5:1 ratio and 50% HCl:MEA in a 5.5:1 ratio indicate the volume amount of the original concentration of a stock solution containing HCl and Monoethanolamine in a ratio of 5.5:1. The HCl loading of a 33% HCl:MEA in a 5.5:1 ratio is approximately 6.5% HCl. The HCl loading of 50% HCl:MEA in a 5.5:1 ratio is approximately 10% HCl.

TABLE 2

Corrosion testing of 316 steel coupons with various acidic fluid at various temperature run of 12 hours at a temperature of 90° C.

| Steel type | Fluid | Corrosion inhibitor | Loss wt (g) | Surface area (cm2) | Density (g/cc) | Mils/yr | Mm/year | Lb/ft2 |
|---|---|---|---|---|---|---|---|---|
| 316 | 33% HCl:MEA in a ratio of 5.5:1 | 1.0% CI-5 0.75% CI-1A 0.1% NE-1 | 1.2899 | 20.968 | 7.92 | 2232.38 | 56.702 | 0.126 |
| 316 | 50% HCl:MEA in a ratio of 5.5:1 | 1.0% CI-5 0.75% CI-1A 0.1% NE-1 | 1.3647 | 20.968 | 7.92 | 2361.83 | 59.991 | 0.133 |

*33% and 50% indicate the level of the original concentration of a stock solution containing HCl and Monoethanolamine in a ratio of 5.5:1.
** All percentages are given in volume/volume % of the total volume of the fluid.

TABLE 3

Corrosion testing of various steel coupons with various acidic fluid at various temperature run time of 6 hours

| Steel type | Fluid | Temp (° C.) | Corrosion inhibitor | Loss wt (g) | Surface area (cm2) | Density (g/cc) | Mils/yr | Mm/year | Lb/ft2 |
|---|---|---|---|---|---|---|---|---|---|
| 316 | 33% HCl:MEA in a ratio of 5.5:1 | 90 | 1.0% CI-5 incl 0.1% ZA 0.75% CI-1A 0.1% NE-1 | 0.2706 | 20.968 | 7.92 | 936.63 | 23.79 | 0.026 |
| 316 | 33% HCl:MEA in a ratio of 5.5:1 | 90 | 2.0% CI-5 0.75% CI-1A 0.1% NE-1 | 0.5990 | 20.968 | 7.92 | 2073.33 | 52.66 | 0.058 |
| 316 | 33% HCl:Urea in a ratio of 1:0.7 | 90 | 0.75% CI-2 0.5% CI-4A 0.5% CI-1A 0.1% NE-1 | 0.8117 | 20.968 | 7.92 | 2809.56 | 71.36 | 0.079 |
| 316 | 33% HCl:MEA in a ratio of 5.5:1 | 90 | 2.0% CI-5 0.75% CI-1A 0.1% NE-1 | 1.1770 | 20.968 | 7.92 | 4073.98 | 103.48 | 0.115 |
| 316 | 33% HCl:MEA in a ratio of 5.5:1 | 90 | 0.75% CI-2 0.5% CI-4A 0.5% CI-1A 0.1% NE-1 | 1.1348 | 20.968 | 7.92 | 3927.91 | 99.77 | 0.110 |
| 316 | 33% HCl:MEA in a ratio of 5.5:1 | 90 | 1.50% CI-5SS 1.0% CI-1A 0.1% NE-1 | 0.1422 | 20.968 | 7.92 | 492.20 | 12.50 | 0.014 |
| 316 | 33% HCl:MEA in a ratio of 5.5:1 | 90 | 1.50% CI-5SS 1.0% CI-1A 0.1% NE-1 | 0.3277 | 20.968 | 7.92 | 756.18 | 19.21 | 0.032 |
| 316 | 50% HCl:MEA in a ratio of 5.5:1 | 90 | 1.50% CI-5SS 1.0% CI-1A 0.1% NE-1 | 0.1974 | 20.968 | 7.92 | 683.27 | 17.36 | 0.019 |
| 316 | 33% HCl:MEA in a ratio of 5.5:1 | 90 | 1.50% CI-5SS 1.0% CI-1A 0.1% NE-1 | 0.6878 | 20.968 | 7.92 | 1587.13 | 40.31 | 0.067 |

TABLE 3-continued

Corrosion testing of various steel coupons with various acidic fluid at various temperature run time of 6 hours

| Steel type | Fluid | Temp (° C.) | Corrosion inhibitor | Loss wt (g) | Surface area (cm2) | Density (g/cc) | Mils/yr | Mm/year | Lb/ft2 |
|---|---|---|---|---|---|---|---|---|---|
| 316 | 50% HCl:MEA in a ratio of 5.5:1 | 90 | 1.50% CI-5SS 1.0% CI-1A 0.1% NE-1 | 0.2246 | 20.968 | 7.92 | 777.41 | 19.75 | 0.022 |
| L80 | 33% HCl:MEA in a ratio of 5.5:1 | 90 | 1.50% CI-5SS 1.0% CI-1A 0.1% NE-1 | 0.147 | 28.922 | 7.86 | 370.68 | 9.42 | 0.010 |
| P110 | 33% HCl:MEA in a ratio of 5.5:1 | 90 | 1.50% CI-5SS 1.0% CI-1A 0.1% NE-1 | 0.112 | 34.839 | 7.86 | 236.15 | 5.998 | 0.007 |
| 316 | 33% HCl:MEA in a ratio of 5.5:1 | 90 | 1.50% CI-5SS 1.0% CI-1A 0.1% NE-1 | 0.0593 | 20.968 | 7.92 | 205.26 | 5.214 | 0.006 |
| 316 | 33% HCl:MEA in a ratio of 5.5:1 | 110 | 1.50% CI-5SS 1.0% CI-1A 0.1% NE-1 | 0.2499 | 20.968 | 7.92 | 864.98 | 21.971 | 0.024 |
| L80 | 33% HCl:MEA in a ratio of 5.5:1 | 110 | 1.50% CI-5SS 1.0% CI-1A 0.1% NE-1 | 0.134 | 28.922 | 7.86 | 338.06 | 8.587 | 0.009 |
| P110 | 33% HCl:MEA in a ratio of 5.5:1 | 110 | 1.50% CI-5SS 1.0% CI-1A 0.1% NE-1 | 0.150 | 34.839 | 7.86 | 315.49 | 8.014 | 0.009 |
| QT900 | 33% HCl:MEA in a ratio of 5.5:1 | 110 | 1.50% CI-5SS 1.0% CI-1A 0.1% NE-1 | 0.082 | 34.839 | 7.86 | 171.50 | 4.356 | 0.005 |
| 316 | 50% HCl:MEA in a ratio of 5.5:1 | 110 | 1.50% CI-5SS 1.0% CI-1A 0.1% NE-1 | 0.1675 | 20.968 | 7.92 | 579.77 | 14.726 | 0.016 |
| L80 | 50% HCl:MEA in a ratio of 5.5:1 | 110 | 1.50% CI-5SS 1.0% CI-1A 0.1% NE-1 | 0.123 | 28.922 | 7.86 | 312.02 | 7.925 | 0.009 |
| P110 | 50% HCl:MEA in a ratio of 5.5:1 | 110 | 1.50% CI-5SS 1.0% CI-1A 0.1% NE-1 | 0.132 | 34.839 | 7.86 | 277.71 | 7.054 | 0.008 |
| QT900 | 50% HCl:MEA in a ratio of 5.5:1 | 110 | 1.50% CI-5SS 1.0% CI-1A 0.1% NE-1 | 0.084 | 34.839 | 7.86 | 176.11 | 4.473 | 0.005 |
| 316 | 7.5% HCl | 90 | 1.50% CI-5SS 1.0% CI-1A 0.1% NE-1 | 0.0729 | 20.968 | 7.92 | 252.33 | 6.409 | 0.007 |
| 316 | 10% HCl | 90 | 1.50% CI-5SS 1.0% CI-1A 0.1% NE-1 | 0.0406 | 20.968 | 7.92 | 140.53 | 3.569 | 0.004 |
| 316 | 15% HCl | 90 | 1.50% CI-5SS 1.0% CI-1A 0.1% NE-1 | 0.0254 | 20.968 | 7.92 | 87.92 | 2.233 | 0.002 |
| 316 | 10% HCl | 90 | 1.50% CI-5 1.0% CA 0.1% NE-1 | 0.0309 | 20.968 | 7.92 | 106.95 | 2.717 | 0.003 |

Notes:
CI-2 is a commercially available corrosion inhibitor (ASP 560)
NE-1 is a non-emulsifier.
CI-4A is propargyl alcohol with methyloxirane.
CI-1A is potassium iodide
ZA refers to cinnamaldehyde

TABLE 4

Corrosion testing carried out at 110° C. for a duration of 6 hours on various types of steel

| Steel type | Fluid | Corrosion inhibitor | Loss wt. (g) | Surface area (cm2) | Density (g/cc) | Mils/yr | Mm/year | Lb/ft2 |
|---|---|---|---|---|---|---|---|---|
| 316 | 50% HCl:MEA in a ratio of 5.5:1 | 1.50% CI-5SS 1.0% CI-1A 0.1% NE-1 | 0.1675 | 20.968 | 7.92 | 579.77 | 14.726 | 0.016 |
| L80 | 50% HCl:MEA in a ratio of 5.5:1 | 1.50% CI-5SS 1.0% CI-1A 0.1% NE-1 | 0.123 | 28.922 | 7.86 | 312.02 | 7.925 | 0.009 |
| P110 | 50% HCl:MEA in a ratio of 5.5:1 | 1.50% CI-5SS 1.0% CI-1A 0.1% NE-1 | 0.132 | 34.839 | 7.86 | 277.71 | 7.054 | 0.008 |
| QT900 | 50% HCl:MEA in a ratio of 5.5:1 | 1.50% CI-5SS 1.0% CI-1A 0.1% NE-1 | 0.084 | 34.839 | 7.86 | 176.11 | 4.473 | 0.005 |

TABLE 5

Corrosion testing at 90° C. for a duration of 6 hours for stainless steel 316 coupons having a density of 7.92 g · cc and surface area of 20.968 cm2

| Fluid | Corrosion inhibitor | Wt loss (g) | Mils/yr | Mm/year | Lb/ft2 |
|---|---|---|---|---|---|
| 7.5% HCl | 0.50% CI-5SS 0.33% CI-1A 0.033% NE-1 | 0.0970 | 335.75 | 8.528 | 0.009 |
| 10% HCl | 0.50% CI-5SS 0.33% CI-1A 0.033% NE-1 | 0.0838 | 290.09 | 7.368 | 0.008 |
| 15% HCl | 0.50% CI-5SS 0.33% CI-1A 0.033% NE-1 | 0.0967 | 334.71 | 8.502 | 0.009 |
| 10% HCl | 0.50% CI-5 0.33% CI-1A 0.033% NE-1 | 0.1729 | 598.46 | 15.201 | 0.017 |
| 33% HCl:Urea in a ratio of 1:0.7 | 1.50% CI-5SS 1.0% CI-1A 0.1% NE-1 | 0.7512 | 2600.15 | 66.044 | 0.073 |
| 10% HCl | No CI | 2.4590 | 8511.40 | 216.189 | 0.239 |

The corrosion testing results obtained indicate, in the preferred corrosion inhibitor developed, CI-5SS, the need for both an alkyne alcohol (propargyl alcohol) and cinnamaldehyde. Separately, they did not provide corrosion protection sufficient to allow the novel method disclosed herein to be implemented. The difficulty with the use of cinnamaldehyde is to maintain it dispersed at higher temperatures such as 90° C. to 110° C. The surfactant package used in the present invention is capable of providing such cinnamaldehyde dispersion but requires higher loadings than usual. Citral has shown some effectiveness for the prevention of pitting at higher temperatures (even 110° C. to 120° C.). The cinnamaldehyde is an effective film former at these temperatures and by was able to protect the stainless steel.

The inventors have noted that, surprisingly, modified acids containing urea are not desirable as they have a stability upper limit of approximately 90° C. Above this temperature, the urea component starts to breakdown and therefore, it would not be the ideal candidate for wireline operations as most operations are performed at temperatures close to or above 90° C. Corrosion inhibitor compositions according to preferred embodiment of the present invention have shown excellent versatility at high temperature (up to 110° C.) between conventional acids (HCl) and modified acids (HCl:MEA) as well as steel types (QT900 (stainless steel); P110 (carbon steel); L80 (carbon steel); 316 (stainless steel)).

FIG. 1 shows a tool, spacer, and acid placed downhole in which the spacer initially separates the acid and tool.

As illustrated in FIG. 1, pumping acid downhole while the wireline and perforating tool is present downhole has been shown in the field to save, in some instances 15 minutes per perforation operation with this particular completion method. Moreover, the savings of water are equally staggering. The following is a list of substantial advantages of performing such a method: combining pumping down the plug with ball in cage and acid; reducing pumpdown cycle time; reducing fluid volumes required, virtually eliminating corrosion concerns, diverting acid across perforations while perforating in acid, decreasing injection pressures thus reducing pumping times equating to substantial dollar savings in equipment charges. The concerns noted by the operators were the following: defining fluid bypass around the plug; the method was dependent on the rate the plug was being pumped; and the rate achieved for pumpdown was variable from stage to stage.

Example 2—Wireline Testing Experiments

Specific tests for a modified acid composition comprising an alkanolamine:HCl blend (present in a molar ratio of 1:6.4 also containing a corrosion inhibitor package)(diluted to one third of its stock solution, i.e. 33%) and a commercialised 7.5% HCl acid blend (containing a currently commercialized CI "corrosion inhibitor" package) spearhead blend were performed on wire-line samples to simulate long term field exposure conditions under extreme conditions. Due to the cool down effect of the injection fluids and limited real-world exposure times, these tests would be indicative of a long-term duty cycle, although acid placed in the casing for later deployment into the perforations can come back to high bottom hole temperatures quickly. It is advantageous to have a system that provides long term casing corrosion protection The tensile strength and corrosion tests were executed on wire line samples provided by Company B. One sample was exposed to 33% alkanolamine:HCl composition and another sample was exposed to the 7.5% HCl acid blend for 96 and 120 consecutive hours at 90° C. (194° F.) at 600 psi. The weight loss of the wire line samples is expected to be attributed not only the corrosion of the steel but also the degradation of the binding material. After the corrosion test cycle, tensile strength testing was conducted on two strands pulled from the wire line exposed to the 33% alkanolamine: HCl composition. The tensile strength values for each strand were equal to control samples that were not exposed to the acid. Tensile strength testing was not performed on the wire line exposed to the 7.5% HCl acid blend due to excessive corrosion.

Example 3—P110 Coupon Corrosion Tests

Long-term corrosion tests on P110 coupons with a 33% alkanolamine:HCl composition and the 7.5% HCl acid blend at 90° C. (194° F.) were also carried out. The corrosion properties of the 33% alkanolamine:HCl composition was observed to provide superior protection in comparison to the 7.5% HCl acid blend over a very long time period. The testing allows the customer to select an ideal composition which will minimize corrosion to the wireline over a number of plug and perf operations as well as limit the risk of corrosion to the casing and other exposed metals such as the perforating guns. However, it should be noted that a less than optimal (where there is more corrosion than an optimal composition under the same conditions) acidic composition comprising a corrosion inhibitor may be employed to perform a method according to the present invention in order to substantially reduce time spent on pre-frac operations, minimize water volumes used and therefore, provide a financial advantage of performing this method as well as a substantial water usage reduction over the conventional approach used prior to this novel method.

Procedure: To determine the corrosion properties of unspent 33% alkanolamine:HCl composition and the 7.5% HCl acid blend (containing a CI package), the acid blends were evaluated at 90° C. (194° F.) on P110 coupons for 96 hours (4 days) at ambient pressure. The corrosion tests were executed in samples containers in a water bath at temperature. The corrosion rates were determined from the weight loss after the coupons were washed and dried.

Results: The testing results confirms the feasibility and viability of a widespread implementation of the method according to a preferred embodiment of the present invention where the step of removing a perforating tool prior to injection of the spearhead acid composition is removed. The test results show that it is a viable long term and scalable invention across a broad range of temperatures covering most all typical formations throughout the world that will save substantial amounts of water and time for industry.

Example 4—Field Trial

A major E&P company operating in Western Canada performing horizontal multi-stage slickwater completions on multi well pads. Using plug and perf completion technique they were targeting the Duvernay and Montney formations. Reservoir temperatures were approximately 230° F. Historically 15% HCl acid was used to breakdown the formation and assist in fracture propagation.

Figure 3A:
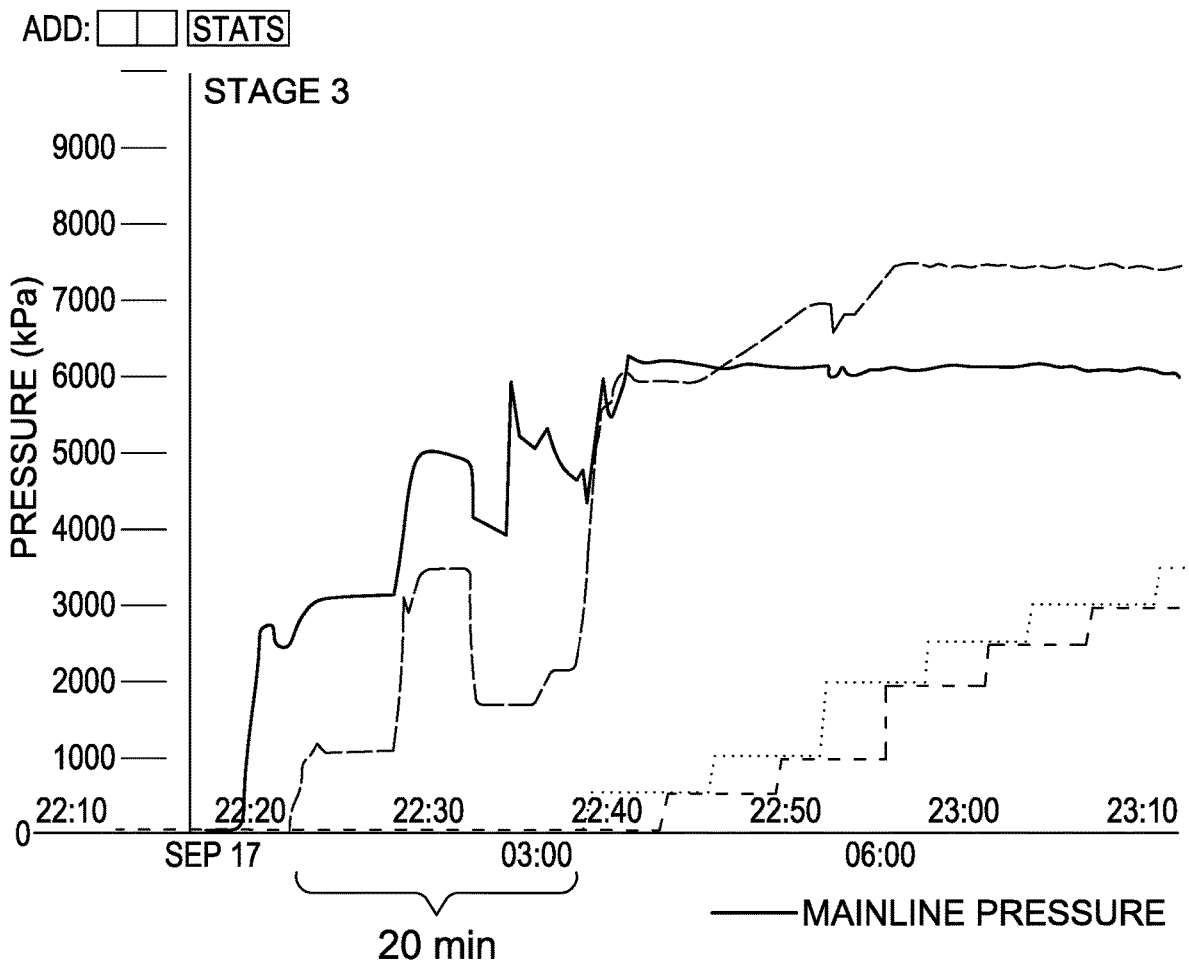
FIG. 3A and FIG. 3B illustrate a comparison of the injection procedure in pre-fracking and fracking operations.
Figure 3B:
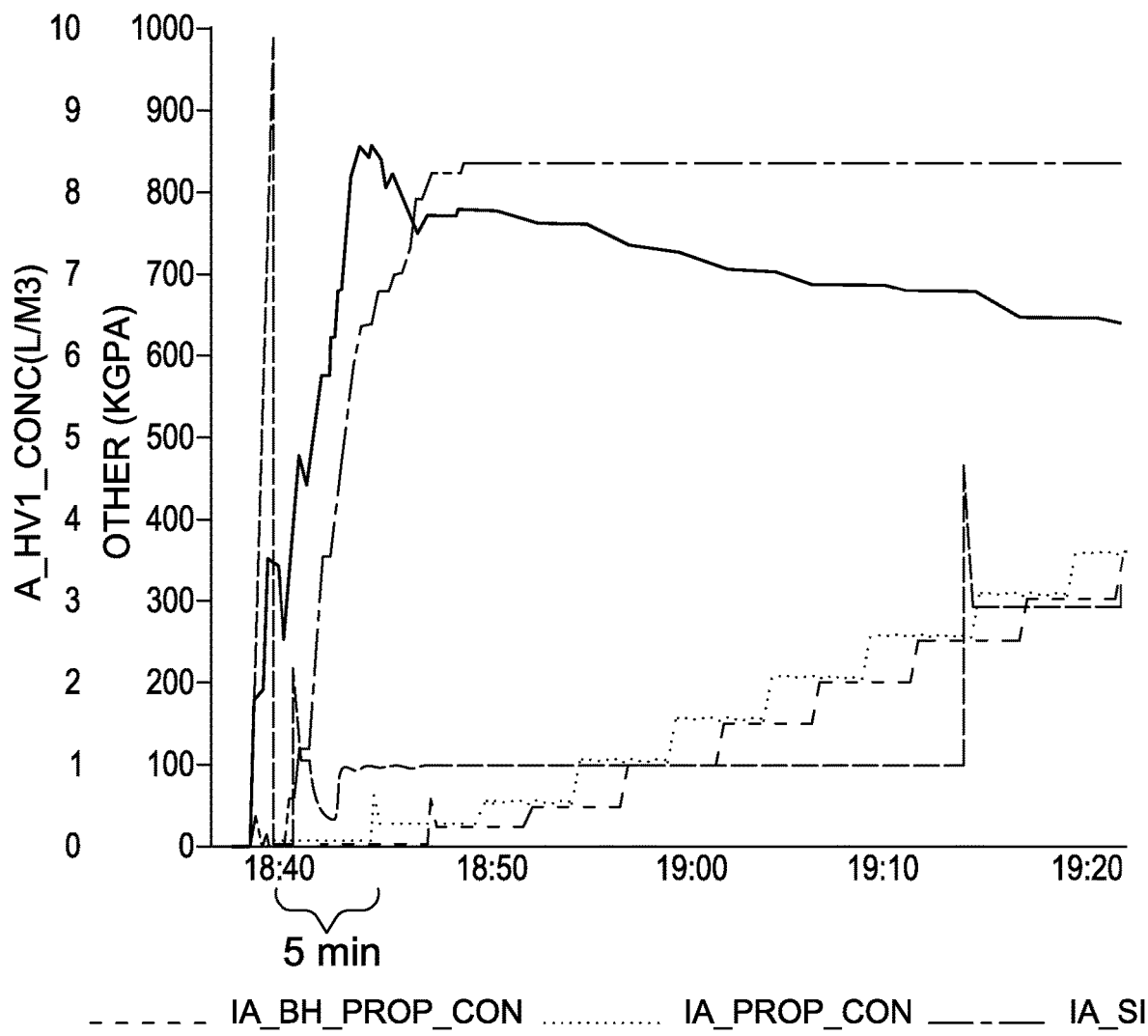

Approximately 97,500 gals of a modified acid using an alkanolamine:HCl composition with a corrosion package was delivered to location. Dilutions ranged from a 2-1 water-acid ratio to yield a 33% modified acid concentration and 1-1 for a 50% dilution. The blended modified acid (1300 gal) was placed in the wellbore and then the wireline and pump-down crews continued to the next well. As the treatment commenced, crews displaced acid to perforations with frac water. Once the acid reached the perforations an immediate pressure drop was observed, all frac pumps were brought on-line to pre-engineered rates and operations commenced. FIGS. 3A and 3B illustrate the time advantage of using an embodiment of the method of the present invention (FIG. 3B) in comparison to the conventional method (FIG. 3A).

A significant pressure drop was observed as the acid reached the perforations and it was noted that breakdowns looked very similar to that obtained with 15% HCl which had been previously pumped on the same pad. Both the service company and operator were very pleased with the performance, ease of use of the acid while utilizing a technically advanced, safer and more environmentally responsible product along with eliminating corrosion concerns was a major value add to the customer and all involved with the project. The modified acid composition allowed the company to have confidence that the casing metals were free from hydrogen embrittlement and any corrosion related issue that would have arisen by utilizing HCl. This time saving method would not be possible with any existing HCl blends offered in the market. Observations by the crew included the time savings. Moreover, the company and pumping crews on location had the opportunity to use an acid which has an inherent safety profile adapted to minimize or eliminate the extremely dangerous properties associated with 15% HCl. Some of the safety factors include: less-corrosive to dermal tissue; low-vapor pressure effect (fuming); low-toxicity (Calculated LD-50 Rat); lower bioaccumulative effect; and biodegradable.

Along with the safety aspect of the acid composition used, there is also the technical advantages it brought to the operations: low corrosion properties—<0.02 lb/ft$^2$ for more than 24 hrs; pump acid with wireline BHA (save time and water); in the event of surface equipment failure occur, there is no need to flush acid out of wellbore; the composition is hauled as a concentrate and diluted on location; provides the ability to adjust acid strength for tougher breakdowns; fewer acid trucks on the road (landowner optics); it is a class one product (chemicals will not separate out over time); and it can be diluted with available water (produced/sea water/fresh). Additional benefits of the modified acid used in the example include: ultra-low long term corrosion effects (168 hrs); no precipitation of solubilized Ca post pH increase (eliminating risks of formation damage); clear: low fuming/vapor pressure; aggressive reaction rates on stimulations and workovers; custom blend allowing spotting of acid with perforating guns via wireline; compatible with typical elastomers used in oil and gas; allows to adjust concentrations on the fly to target optimal pay zones; and it has a high thermal stability up to ~190° C.

Example 5—Field Trial #2

Figure 4A:
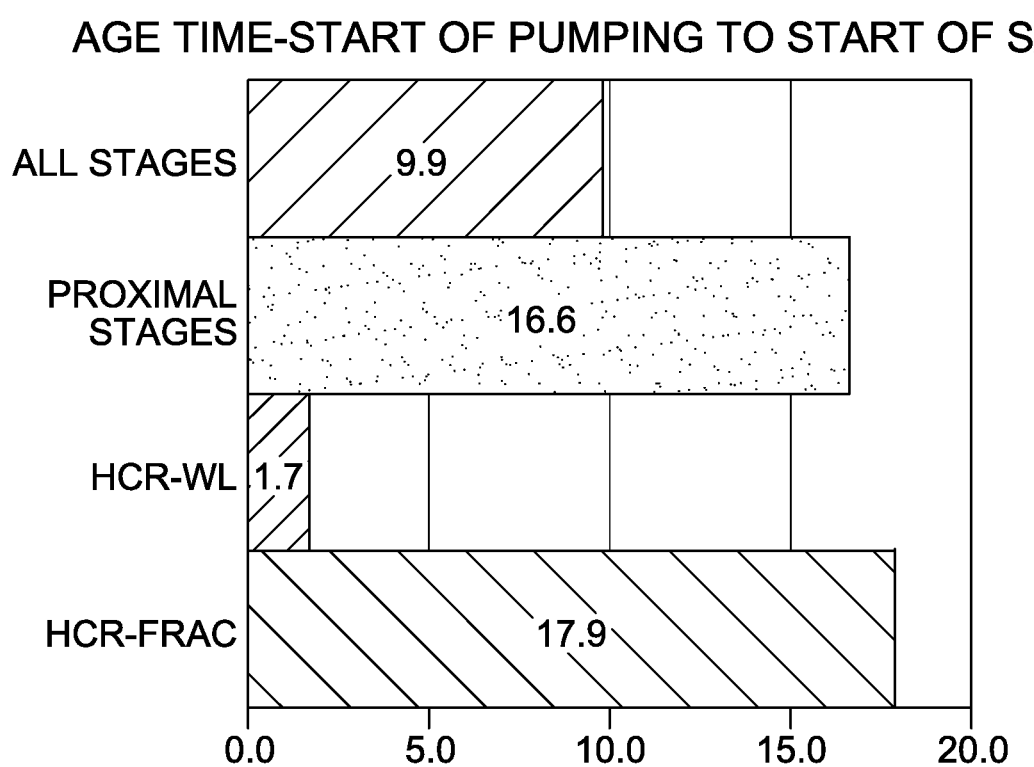
FIG. 4A and FIG. 4B illustrate a bar graph comparison of the various stage times in the pre-fracking and fracking operations.
Figure 4B:
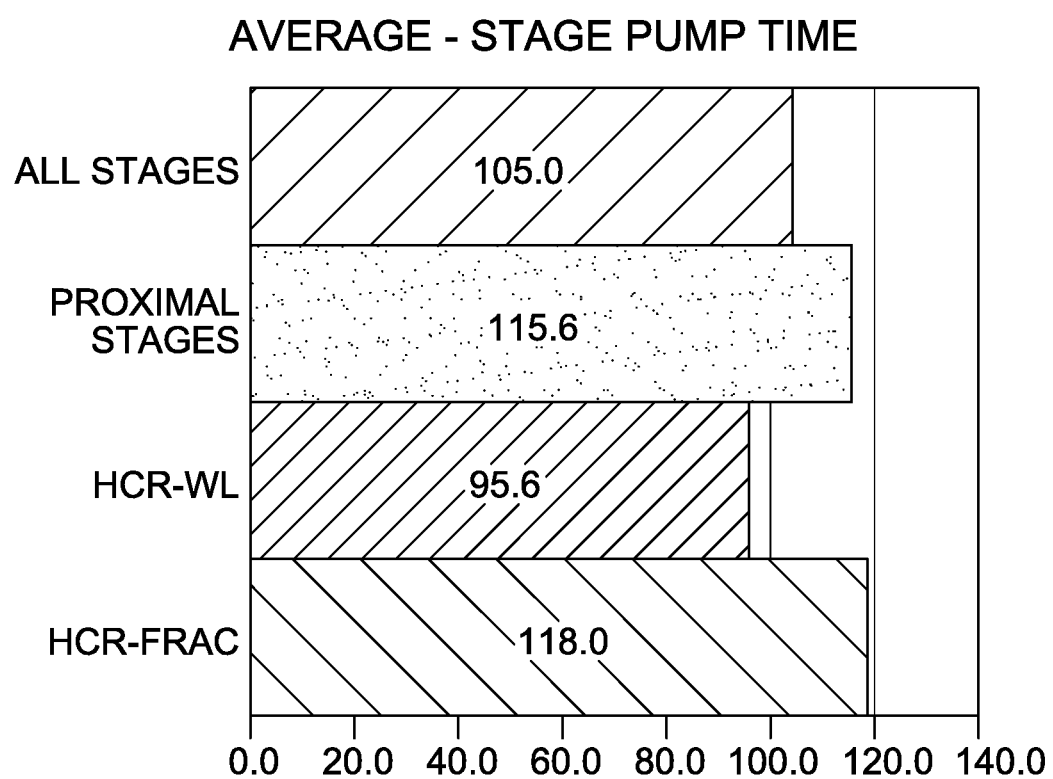

Another large Oil and Gas company carried out wireline plug and perf operations and collected the below information in terms of performance. The average time from start of pumping to start of sand was determined to be 8.2 mins faster for wireline stages where the tools and wireline went downhole together, compared to the average of all other stages. The average stage pump times were determined to be 9.4 mins lower for the Wireline stages where acid was injected along with the perforating tool and wireline, compared to average of all other stages. See FIGS. 4A and 4B which highlight the difference in time for each step.

The company using the method according to a preferred embodiment of the present invention, noted the following spearhead operational efficiencies: the ability to pump acid with wire line and BHA (guns and bridge plug); the elimination of the need to displace acid after wireline is out of the hole; the reduced water requirements; savings of at least one hole volume per frac (>10,000 gal water reduction per stage); allowing acid to be spotted over the entire perf interval cluster; more effective cluster breakdown; increased frac crew efficiency; and shorter time to initiate the frac and get to job rates.

Example 6—Corrosion Testing on Various Wirelines

Corrosion testing was carried out on various manufacturers' wirelines using an acidic composition comprising an alkanolamine:HCl blend with a corrosion inhibitor package. The wireline material of four different manufacturers were tested corrosion resistance at a temperature of 130° C. and at 400 psi for periods of time ranging up to 24 hours of exposure. Table 7 (below) provides a summary of the corrosion data from this testing series.

TABLE 7

Corrosion Test Results of 33% composition comprising MEA:HCl (in 1:4.1 molar ratio) at 130° C. (266° F.) at 400 psi over various time periods

| | | Cumulative Weight Loss | | | | | | | |
|---|---|---|---|---|---|---|---|---|---|
| | | 6 hrs | | 12 hrs | | 18 hrs | | 24 hrs | |
| Test | Sample | mm/yr | lb/ft$^2$ | mm/yr | lb/ft$^2$ | mm/yr | lb/ft$^2$ | mm/yr | lb/ft$^2$ |
| A | #1 clear wire | 19.727 | 0.022 | 22.121 | 0.024 | 25.423 | 0.028 | 28.146 | 0.031 |
| B | #2 clear wire | 18.902 | 0.021 | 20.800 | 0.023 | 23.854 | 0.026 | — | — |
| C | #3 clear wire | 19.810 | 0.022 | 23.772 | 0.026 | 27.651 | 0.030 | — | — |
| D | Sanded wire | 17.334 | 0.019 | 20.470 | 0.022 | 23.277 | 0.026 | 28.229 | 0.031 |

Moreover, tensile strength testing was carried out on both wireline and wireline strands (from two different manufacturers) after exposure to a 33% acidic composition of MEA:HCl (in a molar ratio of 1:4.1) at a temperature of 110° C. The results of pre-exposure are listed in table 8, the results post-exposure are listed in Table 9.

TABLE 8

Tensile strength of the wireline strands and wireline prior to testing

| | Control tensile Strength | | |
|---|---|---|---|
| | Untreated | Average | |
| Sample | N | N | lbF |
| Wireline Strand | 916.79<br>890.82<br>886.34 | 897.98 | 201.87 |
| Wireline | 1665.63<br>1653.90<br>1653.09<br>1581.88<br>1653.99 | 1641.72 | 369.07 |

TABLE 9

Tensile Strength after exposure to a 33% acidic composition of MEA:HCl (in a molar ratio of 1:4.1) at a temperature of 110° C.

Tensile Strength after exposure to a 33% acidic composition of MEA:HCl (in a molar ratio of 1:4.1)

| | 6 hours | 12 hours | 18 hours | Average | |
|---|---|---|---|---|---|
| Sample | N | N | N | N | lbF |
| Wireline Strand #1 | 890.82 | | | 891.94 | 200.52 |
| Wireline Strand #2 | 893.06 | | | | |
| Wireline Strand #3 | | 897.98 | | 923.07 | 207.51 |
| Wireline Strand #4 | | 948.15 | | | |

TABLE 9-continued

Tensile Strength after exposure to a 33% acidic composition of
MEA:HCl (in a molar ratio of 1:4.1) at a temperature of 110° C.

| | Tensile Strength after exposure to a 33% acidic composition of MEA:HCl (in a molar ratio of 1:4.1) | | | | |
|---|---|---|---|---|---|
| | 6 hours | 12 hours | 18 hours | Average | |
| Sample | N | N | N | N | lbF |
| Wireline Strand #5 | | | 842.00 | 882.76 | 198.45 |
| Wireline Strand #6 | | | 923.51 | | |
| Wireline #1 | 1674.14 | | | 1641.72 | 369.07 |
| | 1705.94 | | | | |
| | 1623.53 | | | | |
| Wireline #2 | | 1610.54 | | 1658.31 | 372.80 |
| | | 1743.56 | | | |
| | | 1620.84 | | | |
| Wireline #3 | | | 1643.69 | 1620.99 | 364.41 |
| | | | 1673.69 | | |
| | | | 1545.60 | | |

The results support the applicability, feasibility of the method according to a preferred embodiment of the present invention. Moreover, more optimal compositions falling within the scope of the present invention can be developed in order to obtain better financial, water-savings and/or corrosion results.

According to another preferred embodiment of the method of the present invention, there is provided a method to perform a downhole operation for drilling with acid to increase ROP (rate of penetration) through cement plugs or carbonate formation, said method comprises the following steps:
inserting a drilling tool inside a wellbore;
injecting an acidic composition concurrently with the drilling tool;
position the drilling tool within the wellbore at a point requiring drilling;
contacting the surface requiring drilling with the acid and begin drilling; and
continue the drilling operation until desired distance has been achieved;
where the acidic composition comprises a corrosion inhibitor and is sufficiently balanced to complete the operation of dissolving the acid soluble debris within a time period which will leave the tool with acceptable (in some cases, minimal) corrosion damage from exposure to the acidic composition.

According to yet another preferred embodiment of the method of the present invention, there is provided a method to perform a downhole operation for coiled tubing deployed acid washes, said method comprises the following steps:
inserting a coiled tubing inside a wellbore;
injecting an acidic composition concurrently with the drilling tool;
position the drilling tool within the wellbore at a point requiring drilling;
contacting the surface requiring drilling with the acid and begin drilling; and
continue the drilling operation until desired distance has been achieved;
where the acidic composition comprises a corrosion inhibitor and is sufficiently balanced to complete the operation of dissolving the acid soluble debris within a time period which will leave the tool with acceptable (in some cases, minimal) corrosion damage from exposure to the acidic composition.

According to yet another preferred embodiment of the method of the present invention, there is provided a method to perform a downhole operation for coiled tubing deployed filter cake or scale treatments said method comprises the following steps:
inserting a coiled tubing inside a wellbore;
injecting an acidic composition concurrently with the washing tool;
position the washing tool within the wellbore at a point requiring treatment;
contacting the surface requiring treatment with the acid and begin treatment; and
continue the treatment operation until desired effect has been achieved;
where the acidic composition comprises a corrosion inhibitor and is sufficiently balanced to complete the operation of dissolving the filter cake acid soluble debris within a time period which will leave the tool with acceptable (in some cases, minimal) corrosion damage from exposure to the acidic composition.

According to yet another preferred embodiment of the method of the present invention, there is provided a method to perform a downhole operation for dissolving plugs and balls.

According to yet another preferred embodiment of the method of the present invention, there is provided a method to perform a downhole operation for slower (matrix) rate isolated (thru tubing or coiled tubing) acid stimulations.

According to yet another preferred embodiment of the method of the present invention, there is provided a method to perform a downhole operation for fishing tools in the presence of an acid to consume debris on top of the tool trying to be recovered.

According to yet another preferred embodiment of the method of the present invention, there is provided a method to perform a downhole operation for stuck coil or tools in casing or and open hole section of the wellbore, where the sticking is caused by an acid soluble debris, said method comprising the steps of:
injecting an acidic composition in the wellbore;
pumping or bullheading the acidic composition to the point within the wellbore where said coil is stuck
allowing the acidic composition sufficient contact time at and near said sluffed area to allow the acid soluble debris to be dissolved by the acidic composition,
where the acidic composition comprises a corrosion inhibitor and is sufficiently balanced to complete the operation of dissolving the acid soluble debris within a time period which will leave the tool or drill pipe or tubing with acceptable (in some cases, minimal) corrosion damage from exposure to the acidic composition. Preferably, the following are some of the tools that may be used as part of a bottom hole assembly (BHA): drilling motors; washing tools; perforating guns; fishing tools; plugs; balls; any BHA with a high stainless-steel metal content in general.

According to a preferred embodiment of a method of the present invention, one can perform debris and scale management inside wellbores when having both a tool and an acid present at the same time. According to a preferred embodiment of a method of the present invention, one can perform spotting acid to dislodge stuck pipe inside a wellbore. Preferably, coiled tubing or a BHA (bottom hole assembly) injected into the wellbore can help free downhole in situ items like chokes or flow-controls, safety valves, chokes etc. According to a preferred embodiment of a method of the present invention, one can perform an operation to clean a wellbore with a reaming or washing tool in the presence of an acid.

According to yet another preferred embodiment of the method of the present invention, there is provided a method to perform a downhole operation for spotting or perforating in acid in a wellbore, said method comprising the steps of:
providing a wellbore in need of stimulation;
inserting a plug in the wellbore at a predetermined location;
inserting a perforating tool and a spotting acid into the wellbore;
positioning the tool at said predetermined location;
perforating the wellbore with the tool thereby creating a perforated area; and allowing the spearhead acid to come into contact with the perforated area for a predetermined period of time.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. A method for the fracking or stimulation of a hydrocarbon-bearing formation, said method comprising the steps of:
providing a wellbore comprising a casing;
inserting a plug in the wellbore at a predetermined location;
inserting a perforating tool, a spacer, and an acidic composition into the wellbore;
wherein said acidic composition includes an acid component and wherein said acidic composition is in contact with said casing but separated from said perforating tool by said spacer;
positioning the perforating tool and spacer near said predetermined location;
perforating the wellbore with perforating the tool thereby creating a perforated area;
pumping the acidic composition to the perforated area;
allowing the acidic composition to come into contact with the perforated area for a predetermined period of time to prepare the formation for fracking or stimulation;
removing the perforating tool from the wellbore;
initiating the fracking or stimulation of the perforated area using a stimulation fluid; and
wherein the acidic composition further comprises a corrosion inhibitor, the acid component includes HCl:alkanolamine, and wherein the alkanolamine is selected from the group consisting of: monoethanolamine; diethanolamine; triethanolamine and combinations thereof; and
wherein the acidic composition is balanced to complete the operation of dissolving acid soluble debris.

2. The method according to claim 1, wherein the perforating tool is a perforating gun.

3. The method according to claim 1, wherein the acid component further includes at least one of mineral acids; organic acids; and combinations thereof.

4. The method according to claim 1, wherein the acid component further includes HCl:monoethanolamine.

5. The method according to claim 1, wherein the acidic composition further comprises:
a corrosion inhibiting composition comprising an alcohol, a terpene, a cinnamaldehyde or a derivative thereof, and a solvent.

6. A method for the fracking or stimulation of a hydrocarbon-bearing formation, said method comprising the steps of:
providing a wellbore comprising a casing;
inserting a plug in the wellbore at a predetermined location;
inserting a perforating tool and an acidic composition into the wellbore;
wherein said acidic composition includes an acid selected from the group consisting of mineral acids; organic acids; and combinations thereof, and said acidic composition further includes a corrosion inhibiting composition comprising at least one of an alcohol, a terpene, a cinnamaldehyde or a derivative thereof, and a solvent;
wherein said acidic composition is in direct contact with said casing but separated from said perforating tool;
positioning the perforating tool near said predetermined location;
perforating the wellbore with the perforating tool thereby creating a perforated area and acid soluble debris;
pumping the acidic composition to the perforated area; and
allowing the acidic composition to come into contact with the perforated area and the acid soluble debris for a predetermined period of time to prepare the formation for a fracking or stimulation operation;
initiating the fracking or stimulation of the perforated area using a stimulation fluid; and
wherein the acidic composition further comprises a corrosion inhibitor and the acidic composition is balanced to complete the operation of dissolving the acid soluble debris.

7. A method for the fracking or stimulation of a hydrocarbon-bearing formation, said method comprising the steps of:
providing a wellbore comprising a casing;
inserting a plug in the wellbore at a predetermined location;
inserting a perforating tool, a spacer, and an acidic composition into the wellbore;
wherein said acidic composition includes an acid and wherein said acidic composition is in contact with said casing but separated from said perforating tool by said spacer;
positioning the perforating tool and spacer near said predetermined location;
perforating the wellbore with perforating the tool thereby creating a perforated area;
pumping the acidic composition to the perforated area;

allowing the acidic composition to come into contact with the perforated area for a predetermined period of time to prepare the formation for fracking or stimulation;
removing the perforating tool from the wellbore;
initiating the fracking or stimulation of the perforated area using a stimulation fluid; and
wherein the acidic composition further includes a corrosion inhibitor comprising an alcohol, a terpene, a cinnamaldehyde or a derivative thereof, and a solvent; and
wherein the acidic composition is balanced to complete the operation of dissolving acid soluble debris.

* * * * *